United States Patent
Randall et al.

[11] 3,875,157
[45] Apr. 1, 1975

[54] CYCLIC DIAMIDES OF 2-CHLOROETHYL PHOSPHONIC ACID

[75] Inventors: David I. Randall; Robert W. Wynn, both of Easton, Pa.

[73] Assignee: GAF Corporation, New York, N.Y.

[22] Filed: Sept. 29, 1971

[21] Appl. No.: 184,899

Related U.S. Application Data

[62] Division of Ser. No. 887,746, Dec. 23, 1969, Pat. No. 3,711,272.

[52] U.S. Cl. .... 260/246 B, 260/268 K, 260/293.63, 260/326.61, 260/551 P, 71/86
[51] Int. Cl............................................. C07d 87/38
[58] Field of Search......... 260/268 K, 246 B, 551 P, 260/293.63, 326.61, 268 B

[56] References Cited
OTHER PUBLICATIONS

Nature, Vol. 219, pp. 1064–1065, (1968).
M. I. Kabachnik et al., Chemical Abstracts, Vol. 42, p. 4132, (1948).
A. M. Kinnear et al., Chemical Abstracts, Vol. 47, p. 5878–5879e (1953).
M. I. Kabachnik et al., Chemical Abstracts, Vol. 66, p. 54802U, (1967).

*Primary Examiner*—Donald G. Daus
*Assistant Examiner*—Jose Tovar
*Attorney, Agent, or Firm*—Walter C. Kehm; Martin A. Levitin

[57] ABSTRACT

Plant growth regulating compounds are substituted 2-chloroethylphosphonic diamides of the formula:

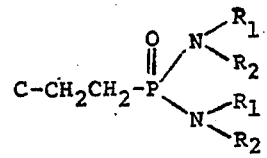

wherein $R_1$ is cycloalkyl, $R_2$ is hydrogen or cycloalkyl or $R_1$ and $R_2$ together form a heterocyclic ring such as morpholine, piperidine or pyrrolidine. They are prepared by the reaction of 2-chloroethylphosphonic dihalide with the appropriate amine or by the reaction of excess amine with a 2-chloroethyl dichlorophosphite followed by rearrangement of the chloroethyl ester intermediate.

8 Claims, No Drawings

3,875,157

CYCLIC DIAMIDES OF 2-CHLOROETHYL PHOSPHONIC ACID

This is a division of application Ser. No. 887,746 filed Dec. 23, 1969 and now issued to U.S. Pat. No. 3,711,272.

BACKGROUND OF THE INVENTION

1. Field of the Invention

This invention relates to cyclic amides of 2-chloroethylphosphonic acids, which compounds are useful as plant growth regulators, and processes for their preparation.

2. Background of the Prior Art

The art is aware that certain phosphorus containing compounds are useful as plant growth regulators. One of the most important phosphorus compounds of this type is 2-chloroethylphosphonic acid which has found importance as a plant growth regulator, particularly in the treatment of pineapples, soy beans and other plants to control their rate of growth. The present invention provides a new class of phosphorus-containing compounds useful as plant growth regulators not known heretofore, which compounds have utility in this area equivalent to 2-chloroethyl phosphonic acid. One of the primary characteristics of products of these types resides in the presence of the 2-chloroethyl group as this is important to the plant growth stimulating activity because it is believed that the action of the compounds is due to the fact that they are absorbed by the plant and release ethylene, a known plant regulator in a form in which it can be used by the plant.

The art is aware of various nitrogen-substituted phosphonamidates but none are suggested as having plant growth activity equivalent to those of the present invention. For example, in Izv. Akad. Nauk. SSSR, Ser. Khim 1966 (8), pages 1365–70, is disclosed P-(2-chloroethyl)-N,N'-tetraethylphosphonic diamide, a non-cyclic diamide which is somewhat analogous. This compound is prepared by the reaction of $ClCH_2CH_2O$ $PCl_2$ on excess diethylamine. Similarly, in Bull. Acad. Sci., Classe Sci. Chim., 1947, pages 97–100, there is disclosed P-(2-chloroethyl)-N,N'-diphenylphosphonic diamide, prepared by the reaction of 2-chloroethylphosphonic dichloride with aniline. In none of these prior art teachings however, is there a disclosure of the N-substituted 2-chloroethylphosphonic acid diamides and in particular, 2-chloroethyl-N-substituted phosphonic amides which have unique activity as plant growth regulators. Accordingly, there is a clear need in the art for products of this type and processes by which they may be prepared.

SUMMARY OF THE INVENTION

It is accordingly one object of this invention to provide a new class of compounds comprising N-substituted 2-chloroethylphosphonic acid diamides.

A further object of the invention is to provide economical processes by which these products may be produced.

It is a still further object of the invention to provide N-substituted 2-chloroethylphosphonic acid diamides which may be prepared from readily available materials in an economic manner as well as procedures for their use as plant growth regulators.

Other objects and advantages of the present invention will become apparent as the description thereof proceeds.

In satisfaction of the foregoing objects and advantages, there are provided by this invention plant growth regulators of the following formula:

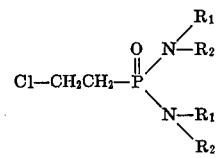

wherein $R_1$ is cycloalkyl, preferably of about 3–8 carbon atoms, such as cyclopropyl, cyclobutyl, cyclopentyl, cyclohexyl, cycloneptyl and cyclooctyl, $R_2$ is hydrogen or the same as $R_1$ or $R_1$ and $R_2$ together can form a heterocyclic ring selected from the group consisting of morpholine, piperidine and pyrrolidine and alkyl substituted derivatives thereof wherein the alkyl group contains 1–5 carbon atoms.

DESCRIPTION OF PREFERRED EMBODIMENTS

It has been found that the above-identified 2-chloroethyl nitrogen-substituted phosphonic acid diamides have unique activity as plant growth regulators and may be applied to plants such as pineapples, soy beans, tomatoes, small grains and the like to regulate growth to thereby improve crop yields thereof. Thus, these compounds may be stated to be plant growth hormones as they operate to increase yields of the products mentioned as well as others.

The compounds of this invention are soluble in varying degrees in water and so they can be applied to the plants in aqueous solutions composed wholly or partially of water; partial solutions include those formed of water and say acetone or methyl ethyl ketone. Any aqueous medium may be used provided that it is not toxic to the plant. Where any particular derivative is less water-soluble, it may be solubilized by the use of co-solvents and the like. Also, the compounds may be absorbed on solid carriers such as vermiculite, attaclay, talc and the like for application in granular form. Dusts may also be used in which case the active ingredient(s) will be diluted with clays or other powders, for example pyrophyllite, diatomaceous earth and attapulgite.

The compounds of this invention can be applied to the plants at a concentration of from ½–10 lbs./Acre or higher, dependent on the particular derivative used. A preferred rate of application ranges from 2–5 lbs./Acre. The phosphonic derivatives need only be applied to the plant in low volumes of water to achieve satisfactory initiation, and this is an important advantage of this invention. Whereas it is necessary to apply the known agents in large volumes of water, on the order of 200–400 gallons/Acre, even up to 1,000 gallons/Acre in the case of ethylene, to achieve initiation, it is possible to apply a compound of this invention in far lower volumes of water to achieve satisfactory flower initiation. For example, the compounds of the present invention can be applied in 50 gallons of water at the rate of 1 lb./Acre to achieve 100 percent flower induction on pineapples of the Smooth Cayenne variety. The ability to apply the agent in a reduced volume of water is a great agronomic advantage because a larger acreage of plantation can be treated before recourse to a water supply is necessary, smaller equipment can be used and costs can be reduced generally.

The diamide compound of this invention may be prepared by the reaction of 2-chloroethylphosphhonic dihalide of the following formula:

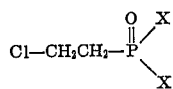

wherein x is halogen, preferably chlorine but it may also be bromine, iodine or fluorine, with an equimolar quantity of an amide of the formula:

wherein $R_1$ and $R_2$ are as above, in the presence of a suitable acid acceptor, the acceptor being employed to remove the hydrogen halide formed during the reaction.

Suitable amines which may be employed in the reaction include cyclopropylamine, cyclobutylamine, cyclopentylamine, cyclohexylamine, cycloheptylamine, cyclooctylamine, as well as mixtures thereof. Also heterocyclic amines may be employed such as morpholine, piperidine, piperazine, pyrrolidine and the like as well as the lower alkyl substituted derivatives thereof. The amines are preferably employed in a solvent solution.

While the acid acceptors for the reaction may be provided by use of an excess of the amine reactant, we prefer to use another less expensive acid acceptor. Such acid acceptors are well known to the art. As preferred acid acceptors which may be employed may be mentioned inorganic acid acceptors such as alkali metal hydroxides (e.g. NaOH and KOH), alkali metal carbonates ($Na_2CO_3$), bicarbonates ($NaHCO_3$) and the like. Also alkaline earth metal hydroxides, oxides, carbonates, etc., may also be employed. Preferred organic acid acceptors are the tertiary amines such as triethyl amine, trimethyl amine, pyridine, etc. Mixtures of acid acceptors may also be employed.

The reaction is conducted in the presence of a solvent or solvent mixture. Preferred solvents to be employed in the process include water, diethyl ether, dioxane, petroleum ether, aromatic hydrocarbons (e.g. benzene, toluene, xylene, etc.), as well as mixtures thereof.

The reaction is conducted at atmospheric pressure and at a low temperature of about −10° to 20°C., preferably 0° to 5°C. In addition, in a preferred aspect, each of the reactants are mixed while contained in the solvent. Moreover, when employing an outside acid acceptor, it is preferred if the reactants are contacted in stoichiometric quantities.

The process is preferably conducted by charging each of the reacting materials to a portion of the solvent, and the solutions contacted at the low temperatures mentioned. In a preferred procedure, the starting 2-chloroethyl compound is generally charged to a portion of the solvent, cooled to about −10° to 20°C. and a solution of the amine added thereto. Generally, either an excess of the amine or another acid acceptor is added simultaneously or prior to addition of the amine.

After the materials have been mixed, the reaction mixture is generally agitated for a short period at room temperature, any amine salt formed is removed and the resulting filtrate freed of solvent to provide the products of the invention.

A second procedure by which the products of the invention can be prepared is by the action of an excess of the amine on 2-chloroethyl dihalophosphite. In this reaction, the 2-chloroethylphosphonic acid diamide results from rearrangement of the chloroethyl ester of the substituted diamidophosphorus acid which is initially formed in the reaction. This reaction proceeds by the following equation:

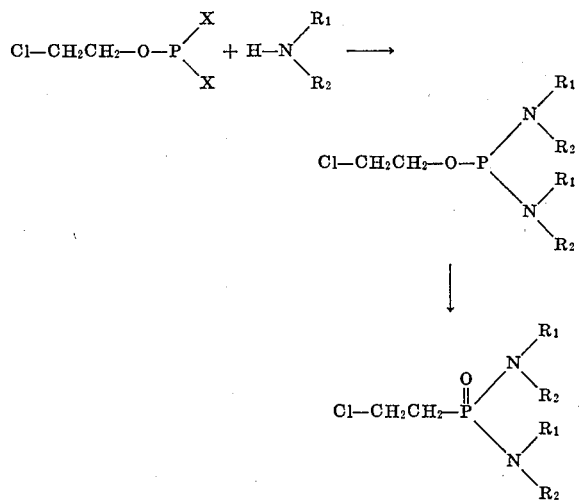

wherein, in the equation, X, $R_1$ and $R_2$ are as defined above.

The starting material for this reaction is formed by the reaction of ethylene oxide on phosphorus trihalide (e.g. $PCl_3$) to form for example 2-chloroethyldichlorophosphite. This starting material is then reacted with the amine of choice at a temperature of about −10° to 20°C., preferably 0°–5°C., with the solvents and procedures discussed above for the alternative method for formation of the products. This intermediate, 2-chloroethyldiamidophosphorus acid, is then rearranged as indicated above, by stirring at 20°–30°C. to form the 2-chloroethylphosphonic acid diamide.

It is therefore to be understood that the products of this invention may be prepared by either of the above alternative processes of preparation or by any other suitable method.

The following working examples are provided to illustrate the compounds and processes of the present invention.

EXAMPLE I

P-(2-chloroethyl)-N,N'-dicyclopropylphosphonic Diamide

There was charged to a reaction flask 57.0 grams (0.2 mol) of a 20 percent aqueous cyclopropylamine solution, 50 ml. water, 16.8 grams (0.2 mol) sodium bicarbonate, and 100 ml. ether. The mixture was cooled to 5°C. and there was added dropwise a solution of 18.2 grams (0.1 mol) 2-chloroethylphosphonyl dichloride in 100 ml. ether. The mixture was stirred at room temperature until the ether evaporated. The product was collected on a filter and dried. Yield = 34.8 grams.

The solid product was extracted twice with 50 ml. portions of methanol and filtered. The filtrate was flash evaporated at 50°C. to yield 16.9 grams of a brown viscous liquid.

EXAMPLE II

Diamide from Morpholine and 2-Chloroethylphosphonic Dichloride

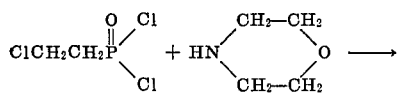
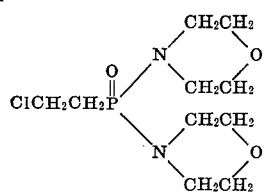

Into a flask protected from the atmosphere with a drying tube there was charged 34.8 grams (0.4 mol) morpholine and 500 ml. benzene. At 0°–5°C. there was added dropwise a solution of 18.2 grams (0.1 mol) 2-chloroethylphosphonyl dichloride in 100 ml. benzene. The mixture was stirred 1 hour at room temperature. The morpholine hydrochloride was filtered off and washed with benzene. The filtrate was flash evaporated to constant weight. There was obtained 26.0 grams of solid product melting at 95°–97°C.

EXAMPLE III

Diamide from piperidine and 2-chloroethylphosphonyl Dichloride

Into a flask protected with a drying tube was charged 34.0 grams (0.4 mol) piperidine and 500 ml. benzene. At 0°–5°C. there was added dropwise a solution of 18.2 grams (0.1 mol) 2-chloroethylphosphonyl dichloride in 100 ml. benzene. After stirring 1 hour at room temperature the piperidine hydrochloride was filtered off and washed with benzene. The filtrate was flash evaporated to constant weight. There was obtained 27.4 grams of viscous brown liquid.

EXAMPLE IV

P-(2-chloroethyl)-N,N'-dicyclohexylphosphonic Diamide

There was charged 100.0 grams (0.2 mol) of a 20 percent aqueous cyclohexylamine solution, 50 ml. water, 21.2 grams (0.2 mol) sodium carbonate, and 100 ml. ether. The mixture was cooled to 5°C. and there was added dropwise a solution of 18.2 grams (0.1 mol) 2-chloroethylphosphonyl dichloride in 100 ml. ether. The mixture was stirred at room temperature until the ether evaporated. The product was collected on a filter and dried. Yield = 39.8 grams.

The solid product was extracted twice with 50 ml. portions of methanol and filtered. The filtrate was flash evaporated at 50°C. to yield 20.1 grams of a brown viscous liquid.

EXAMPLE V

Diamide from Pyrrolidine and 2-Chloroethylphosphonic Dichloride

Into a flask protected from the atmosphere with a drying tube there was charged 28.4 grams (0.4 mol) pyrrolidine and 500 ml. m-xylene. At 0°–5°C. there was added dropwise a solution of 18.2 grams (0.1 mol) 2-chloroethylphosphonyl dichloride in 100 ml. m-xylene. The mixture was stirred 1 hour at room temperature. The pyrrolidine hydrochloride was filtered off and washed with m-xylene. The filtrate was flash evaporated to constant weight. There was obtained 22.4 grams of solid product.

The invention has been described herein with reference to certain preferred embodiments. However, the invention is not to be considered as limited thereto as obvious variations thereon will become apparent to those skilled in the art.

What is claimed is:

1. A substituted 2-chloroethyl phosphonacid diamide of the following formula:

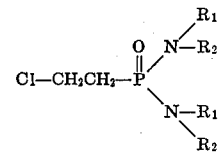

wherein $R_1$ is cycloalkyl of 3 to 8 carbon atoms, $R_2$ is hydrogen or cycloalkyl of 3 to 8 carbon atoms or $R_1$ and $R_2$ together form a heterocyclic ring selected from the group consisting of morpholine, piperidine, pyrrolidine, piperazine and alkyl substituted derivatives thereof wherein the alkyl group has 1–5 carbon atoms.

2. A compound according to claim 1 wherein $R_1$ is cyclopropyl and $R_2$ is hydrogen.

3. A compound according to claim 1 wherein $R_1$ and $R_2$ together with the nitrogen atom is piperidine.

4. A compound according to claim 1 wherein $R_1$ is cyclohexyl and $R_2$ is hydrogen.

5. A compound according to claim 1 wherein $R_1$ is cycloalkyl of 3 to 8 carbon atoms and $R_2$ is hydrogen.

6. A compound according to claim 1 wherein $R_1$ and $R_2$ together with the nitrogen atom form the pyrrolidine ring.

7. A substituted 2-chloroethyl phosphonic acid heterocyclic tertiary diamide of the following formula:

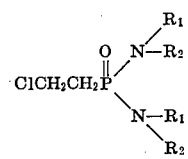

wherein $R_1$ and $R_2$ together form a heterocyclic ring selected from the group consisting of morpholine, piperidine, pyrrolidine, piperazine and alkyl substituted derivatives thereof wherein the alkyl group has 1–5 carbon atoms.

8. A substituted 2-chloroethyl phosphonic acid heterocyclic tertiary diamide having the following formula:

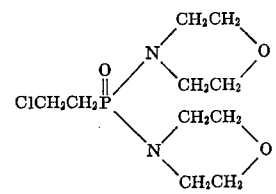

* * * * *